United States Patent [19]

Pachuta

[11] 3,762,784

[45] Oct. 2, 1973

[54] ROLLER ASSEMBLY

[75] Inventor: Martin Pachuta, Allen Park, Mich.

[73] Assignee: Jervis B. Webb Company, Detroit, Mich.

[22] Filed: June 19, 1972

[21] Appl. No.: 264,380

[52] U.S. Cl. .............................................. 308/207
[51] Int. Cl. ........................................... F16c 43/04
[58] Field of Search ................ 308/207, 189, 207.1, 308/289.1

[56] References Cited
UNITED STATES PATENTS 1,368,410    2/1921    Pratt .............................. 308/207 R Primary Examiner—Charles J. Myhre
Assistant Examiner—Frank Susko
Attorney—Farley, Forster & Farley

[57] ABSTRACT

A roller assembly consisting of a roller element rotatably mounted on a pair of tapered roller bearings, each bearing being in turn supported on one of a pair of bearing retainers held in axially spaced assembled relationship by a spacer member which also defines a minimum axial separation between the inner, or cone elements of the roller bearings so that the roller assembly can be securely mounted on an axle passing through the bearing retainers without effecting a proper clearance adjustment of the roller bearings. The spacer is made as a longitudinally slotted tube and is expanded in assembly into gripping engagement with cylindrical surfaces on the pair of bearing retainers, which surfaces also support the bearing cones; and, the slot in the tube also provides communication with a lubricant reservoir formed between the tube and the inner diameter of the roller element and extending between the pair of roller bearings.

10 Claims, 2 Drawing Figures

PATENTED OCT 2 1973　　3,762,784

3,762,784

ROLLER ASSEMBLY

SUMMARY OF THE INVENTION

This invention relates to an improved construction for a roller assembly which includes a roller element rotatably mounted on a pair of tapered roller bearings. Such a roller assembly may, for example, be employed to guide a conveyor chain.

Satisfactory operation and service life of a roller assembly of this type depends upon the proper and rather precise definition of clearances for the tapered roller bearings, the proper lubrication thereof, and the exclusion of dirt from the bearings by properly functioning seals.

The present invention provides a roller assembly, of relatively simple construction, in which the positioning and adjustment of a pair of roller bearings, and the positioning of seals therefor, is established and defined by the manufacture and assembly of the component parts, and the relationship between these parts is not effected by the skill and experience of the person who installs the assembly. Adequate lubrication is also provided at the time of manufacture, with optional provision for further lubrication during the service life of the assembly, where desired.

The roller assembly of the invention is adapted to be mounted on an axle and has a rotatable element supported by a pair of tapered roller bearings, each roller bearing including a cone, a cup and a plurality of tapered rollers. The improvements of the invention include the provision of an axial bore in the rotatable element and a counterbored recess at each end of the bore to define a pair of oppositely facing shoulders. Each recess receives the cup of one of the roller bearings, and the recess shoulders define the axial spacing between the bearing cups. A pair of bearing cone retainers each have an axle mounting bore and a concentric cylindrical outer surface receiving the cone of one of the roller bearings against a radial abutment surface, with the radial abutment surfaces of the pair of bearing cone retainers facing each other. A cylindrical tubular spacer member is mounted on the cylindrical outer surfaces of the pair of bearing cone retainers, the spacer member abutting and extending between the cones of the roller bearings to maintain a minimum axial separation therebetween and also between the bearing cone retainers. This spacer member is secured to the pair of bearing cone retainers and holds the component parts of the assembly in assembled relationship.

Preferably, the tubular spacer member is formed with a slot extending from end-to-end through the side wall thereof and with an internal diameter less than the diameter of the cylindrical outer surfaces of the bearing cone retainers. This slotted construction of the spacer member permits it to be expanded into frictional gripping engagement with the cylindrical outer surfaces of the bearing cone retainers, and the slot further provides a passage to a lubricant reservoir formed between the outer surface of the tubular spacer member and the inner surface of the bore in the rotatable element. The lubricant reservoir extends axially between the roller bearings, and additional lubricant can be supplied to the reservoir during the service life of the roller assembly through a lubricant passage in the axle on which the assembly is mounted.

Improved bearing seals each include an annular backing member having a resilient sealing member secured thereto. The backing member is press-fitted within one of the recesses of the rotatable element to a position in which the sealing member extends radially inwardly into sealing contact with both the adjacent bearing cone and cone retainer.

Other features and advantages of the invention will appear from the following description of the presently preferred embodiment thereof illustrated in the accompanying drawings.

DESCRIPTION OF THE PREFERRED EMBODIMENT

Figure 1:
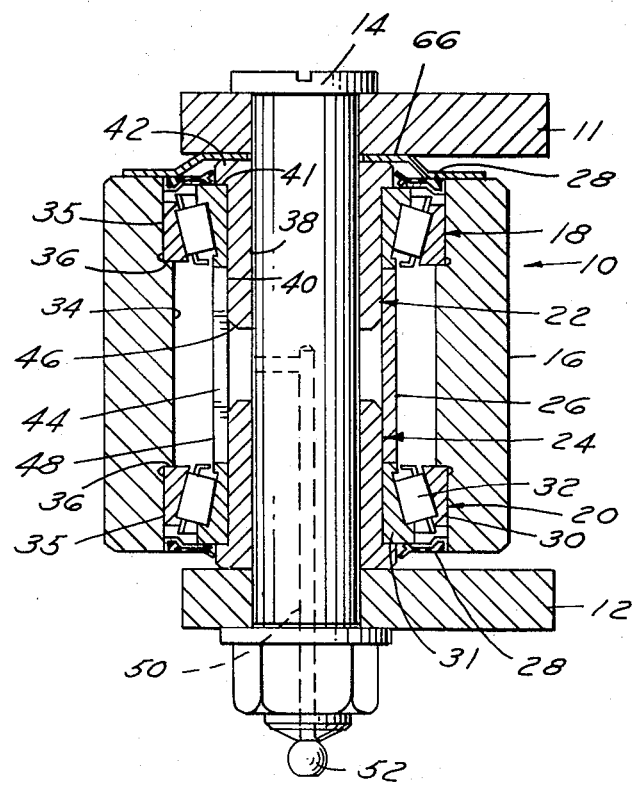
FIG. 1 is a sectional elevation of a roller assembly constructed in accordance with the invention, shown mounted on an axle between a pair of supporting frame bars; and, FIG. 2 is an enlarged sectional detail showing the construction and mounting of a bearing seal used in the roller assembly of FIG. 1.

The roller assembly 10 shown in FIG. 1 is installed between a pair of frame bars 11 and 12, being mounted on a bolt 14 passing through the frame bars and serving as an axle. This installation is typical of that employed for rollers which guide a chain along a portion of a conveyor. For example, in an overhead trolley conveyor, a series of such roller assemblies may be used to maintain the chain in vertical alignment with a curved section of track.

The roller assembly 10 consists of a rotatable element or roller 16, a pair of tapered roller bearings 18 and 20, a pair of bearing retainers 22 and 24, a spacer 26 and a pair of bearing seals 28. Each of the roller bearings 18 and 20 is of conventional construction and includes a cup 30, a cone 31 and a plurality of tapered rollers 32.

An axial bore 34 is formed in the roller 16, and a counterbored recess 35 at each end of the bore 34 defines a pair of oppositely facing shoulders 36. Each bearing cup 30 is pressed within one of the recesses 35 into abutment with the recess shoulder 36 so that the shoulders 36 define the axial spacing between the bearing cups.

Each of the bearing cone retainers 22 and 24 has a bore 38 for mounting on the axle bolt 14, and has a cylindrical outer surface 40 terminating in a radial abutment surface 41 formed as part of an enlarged outer end portion 42 of each of the bearing cone retainers. The cone 31 of each roller bearing 18 and 20 is received with a press fit on the outer cylindrical surface 40 of one of the bearing cone retainers 22 and 24 and engages the radial abutment surface 41 thereof.

The spacer 26 is of cylindrical tubular configuration, is formed with a slot 44 extending from end-to-end thereof, and is mounted on the cylindrical outer surfaces 40 of the bearing cone retainers with the ends of the spacer abutting the cones 31 of the roller bearings 18 and 20 to thereby maintain a minimum axial separation between the bearing cones and also between the bearing cone retainers. The spacer is also secured to the bearing cone retainers 22 and 24, as by a press fit, and thus holds the components of the assembly together. In the preferred construction shown, the spacer 26 is made with an internal diameter slightly less than the diameter of the cylindrical outer surfaces 40 of the bearing cone retainers. When assembled thereon, which operation is facilitated by the provision of chamfered surfaces 46 on the facing ends of the retainers 22 and 24, the slotted construction permits the spacer to expand into frictional gripping engagement with the cylindrical outer surfaces 40.

The outer surface 48 of the spacer 26 is separated radially from the internal surface 34 of the roller 16 to provide an annular lubricant reservoir extending axially between the bearings 18 and 20, and the slot 44 in the spacer serves to provide a passage communicating with this reservoir. This enables the roller bearings 18 and 20 to be lubricated internally at the time the roller assembly is manufactured; also, lubricant may be supplied to the roller assembly during the service life thereof by using a standard form of the axle bolt 14 provided with a lubricant passage 50 and fitting 52.

Figure 2:
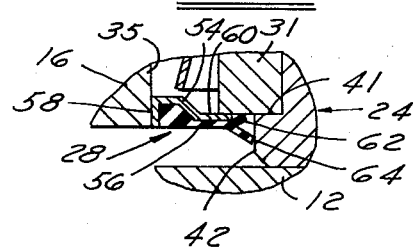

As shown in FIG. 2, each of the bearing seals 28 consists of a backing member 54 and a resilient sealing member 56. The backing member 54 is formed with an axially extending flange 58 press fitted within the recess 35 of the roller 16, and with an inwardly projecting portion 60 which overlaps the end of the adjacent bearing cone 31. The sealing member 58 has a pair of sealing projections or lips 62 and 64 which extend radially inwardly, the lip 62 contacting the adjacent bearing cone 31 and the lip 64 making sealing contact with the end portion 42 of the adjacent bearing cone retainers 22 or 24.

If the roller assembly 10 is used under dusty or dirty conditions, the efficiency and life of the bearing seals, particularly the upper seal in a vertical axis installation such as shown, may be increased by employing a dust cap 66 which is positioned by the axle bolt 14 on the end 42 of the upper bearing cone retainer 22 and extends into overlapping relation with the roller 16 outwardly from the adjacent roller bearing 18.

It will be appreciated that the roller assembly 10 is relatively inexpensive to manufacture and simple to assemble. Precise adjustment of the tapered roller bearings 18 and 20 is readily defined by the dimensioning of the shoulders 36 at the ends of the counterbored portion of the roller 16 and by the longitudinal dimension of the spacer 26. When the spacer is assembled onto the cylindrical surfaces 40 of the bearing cone retainers 22 and 24, the desired adjustment of the roller bearings is set and will not be disturbed by the installation operation of inserting and tightening the axle bolt 14. The spacer 26 also serves as a retainer to hold the component parts in properly assembled relation prior to installation, and forms part of the lubricant reservoir and lubrication system for the bearings 18 and 20. The precise positioning of the parts and adjustment of the roller bearings permits the use of the improved seals 28 and insures proper sealing contact of the dual sealing lips 62 and 64 with the bearing cones 31 and bearing cone retainers 22 and 24, which elements are stationary when the roller assembly is in use.

I claim:

1. A roller assembly adapted to be mounted on an axle and having a rotatable element supported by a pair of tapered roller bearings, each roller bearing including a cone, a cup and a plurality of tapered rollers; wherein:
   the rotatable element is provided with an axial bore and a counterbored recess at each end thereof defining a pair of oppositely facing shoulders, each recess receiving the cup of one of the roller bearings, and the recess shoulders defining the axial spacing between the bearing cups;
   a pair of bearing cone retainers each have an axle mounting bore and a concentric cylindrical outer surface receiving the cone of one of the roller bearings against a radial abutment surface, with the radial abutment surfaces of the pair of bearing cone retainers facing each other;
   a cylindrical tubular spacer member is mounted on the cylindrical outer surfaces of the pair of bearing cone retainers, the spacer member abutting and extending between the cones of the roller bearings to maintain a minimum axial separation therebetween and between the bearing cone retainers; and,
   the spacer member is secured to the pair of bearing cone retainers whereby the spacer member holds the bearing cone retainers in assembled relationship.

2. A roller assembly according to claim 1 wherein the tubular spacer member is separated radially from the internal surface of the axial bore of the rotatable element to provide an annular lubricant reservoir extending axially between the roller bearings.

3. A roller assembly according to claim 2 wherein the tubular spacer member is provided with a passage communicating with said reservoir.

4. A roller assembly according to claim 3 wherein the passage is formed by a slot cut in the side wall of the tubular spacer member and extending from end-to-end thereof.

5. A roller assembly according to claim 4 wherein the tubular spacer member is formed with an internal diameter less than the diameter of the cylindrical outer surface of the bearing cone retainers, the slot permitting the tubular spacer member to be expanded and secured to the pair of bearing cone retainers by gripping engagement with the cylindrical outer surfaces thereof.

6. A roller assembly according to claim 1 wherein the spacer member is secured to the pair of bearing cone retainers by frictional engagement therebetween.

7. A roller assembly according to claim 6 wherein the tubular spacer member is formed with a slot extending from end-to-end through the side wall thereof and with an internal diameter less than the diameter of the cylindrical outer surfaces of the bearing cone retainers, the slot permitting the tubular spacer member to be expanded into frictional gripping engagement with said cylindrical outer surfaces.

8. A roller assembly according to claim 7 wherein the tubular spacer member is separated radially from the internal surface of the bore of the rotatable element to provide an annular, lubricant reservoir extending axially between the roller bearings, with the slot in the tubular spacer member providing a passage communicating with the reservoir and with a lubricant passage in the axle on which the roller assembly is mounted.

9. A roller assembly according to claim 1 further comprising a pair of bearing seals each having an annular backing member adapted to be press fitted within one of the recesses of the rotatable element and a resilient member secured to the backing member, the resilient member having a pair of sealing projections extending radially inwardly, one projection being adapted to make sealing contact with the adjacent bearing cone and the other projection being adapted to make sealing contact with the adjacent bearing cone retainer.

10. A roller assembly according to claim 9 further including a cap adapted to be positioned on the end of one of the bearing cone retainers and overlapping the rotatable element radially outward from the adjacent bearing.

* * * * *